United States Patent [19]

Naumec

[11] 4,406,180
[45] Sep. 27, 1983

[54] INDEXING APPARATUS FOR ELECTRON BEAM DRILLING

[75] Inventor: John R. Naumec, Willimantic, Conn.

[73] Assignee: United Technologies Corporation, Hartford, Conn.

[21] Appl. No.: 208,914

[22] Filed: Nov. 21, 1980

[51] Int. Cl.³ .............................................. B23Q 17/00
[52] U.S. Cl. ................................... 74/822; 74/813 C; 74/813 L; 414/736; 414/728
[58] Field of Search ............. 74/813 R, 813 C, 813 L, 74/826, 816, 817, 822; 414/736, 728, 744 A

[56] References Cited

U.S. PATENT DOCUMENTS

| | | | |
|---|---|---|---|
| 2,848,909 | 8/1958 | Hill | 74/822 |
| 2,965,208 | 12/1960 | Forster et al. | 74/813 |
| 2,968,973 | 1/1961 | Mead | 74/815 |
| 2,985,038 | 5/1961 | Tandler et al. | 74/815 |
| 3,103,857 | 9/1963 | Geisler et al. | 414/744 A |
| 3,532,009 | 10/1970 | Hogan et al. | 74/817 |
| 3,888,140 | 6/1975 | Mackelvie | 74/826 |
| 3,926,421 | 12/1975 | Reiger, Jr. et al. | 74/817 |

FOREIGN PATENT DOCUMENTS 1484398 9/1977 United Kingdom ................. 74/813

*Primary Examiner*—Kenneth Dorner
*Attorney, Agent, or Firm*—C. G. Nessler

[57] ABSTRACT

In an apparatus for manipulating workpieces in an electron beam drilling machine, workpieces are mounted on rotatable disks which in turn are mounted on a housing which is rotatable and translatable. Each disk, as a fixture holding the workpiece, is unlocked, rotated, and locked in a new position by the motion of a single driving member and associated elements. The single driving members associated with each workpiece indexing assembly are driven through a system of gears from a single central shaft which passes through the vacuum chamber wall to externally mounted actuators and controls.

8 Claims, 9 Drawing Figures

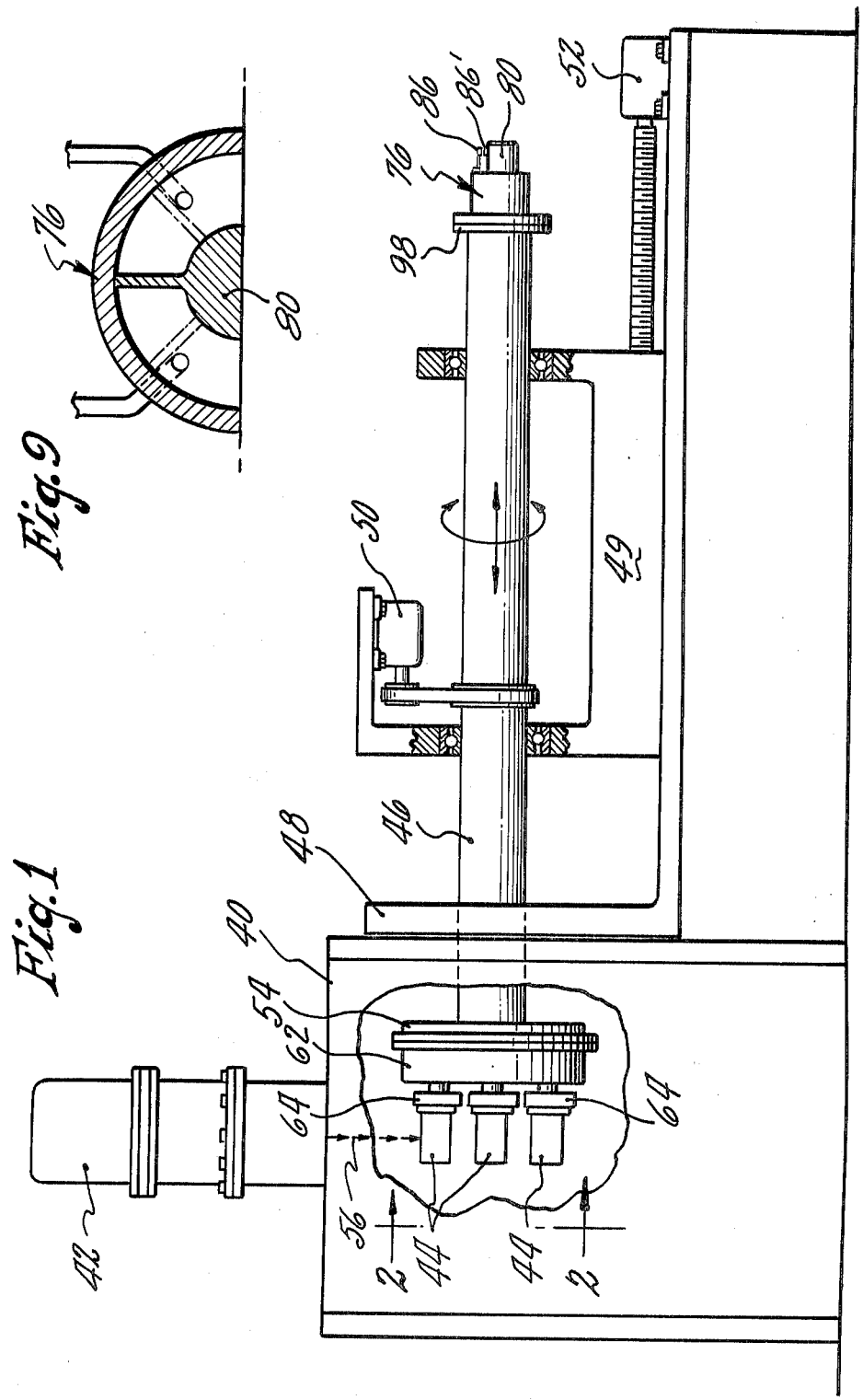

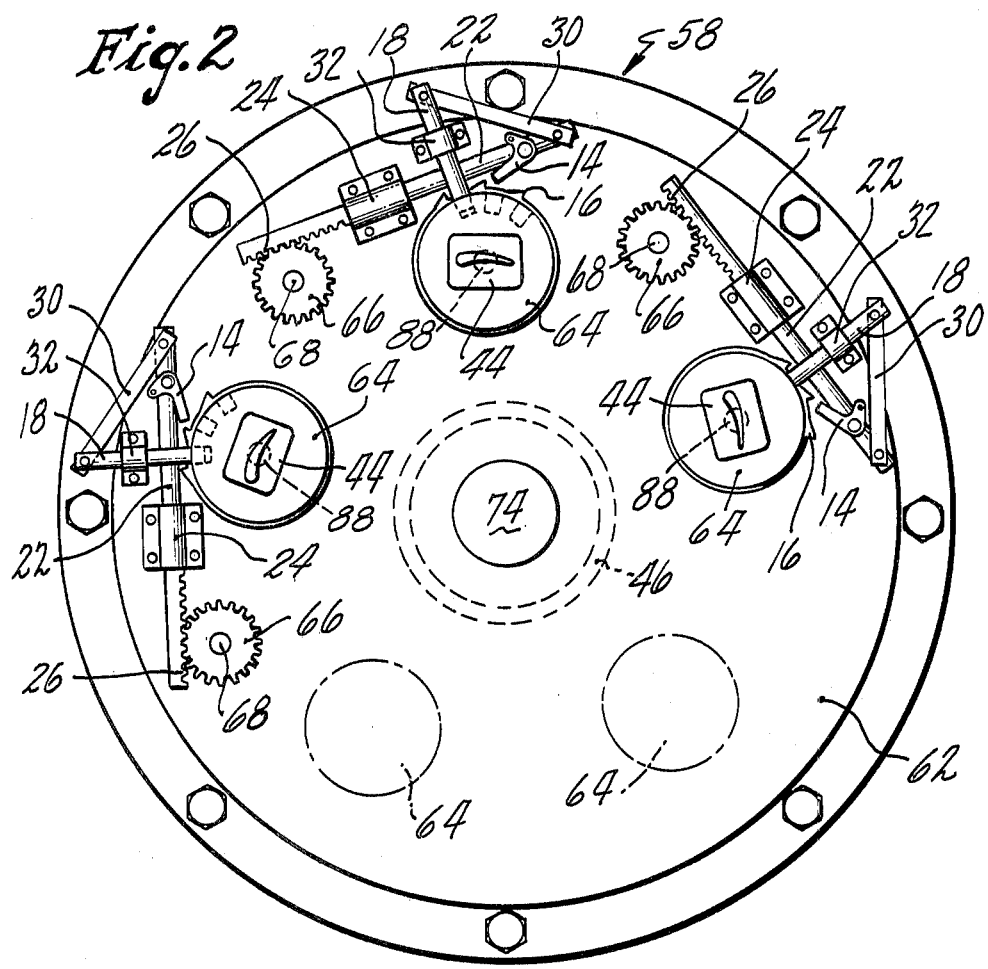

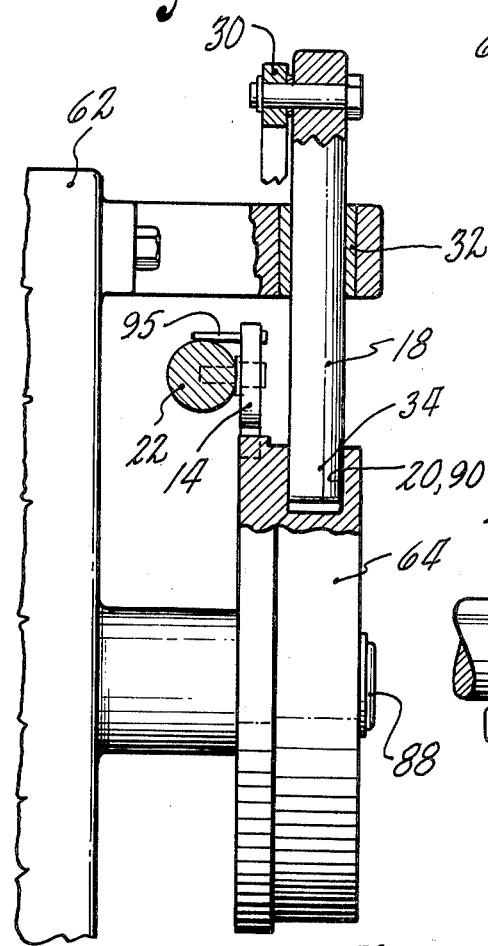
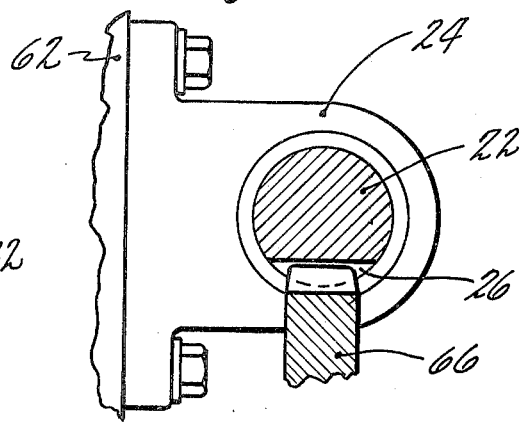
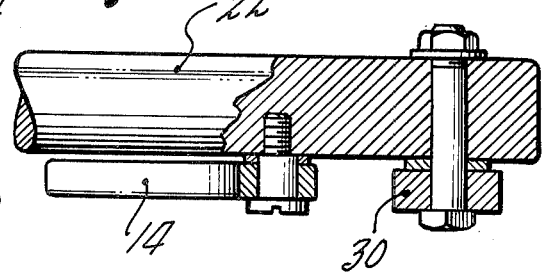
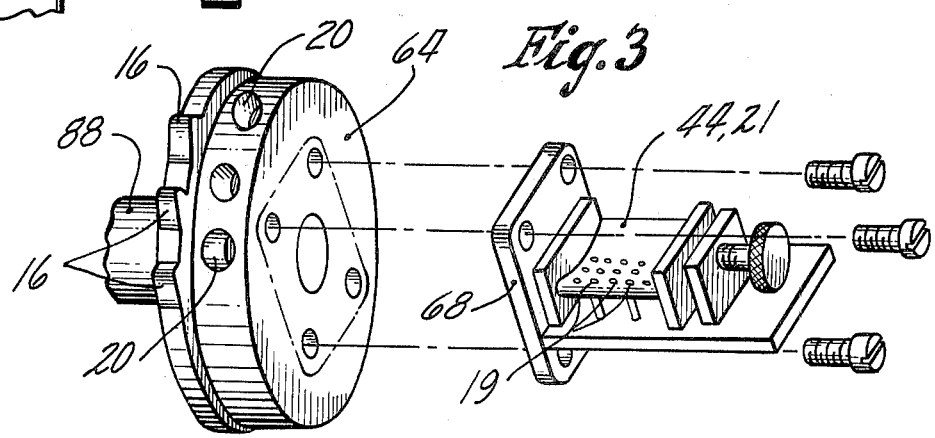

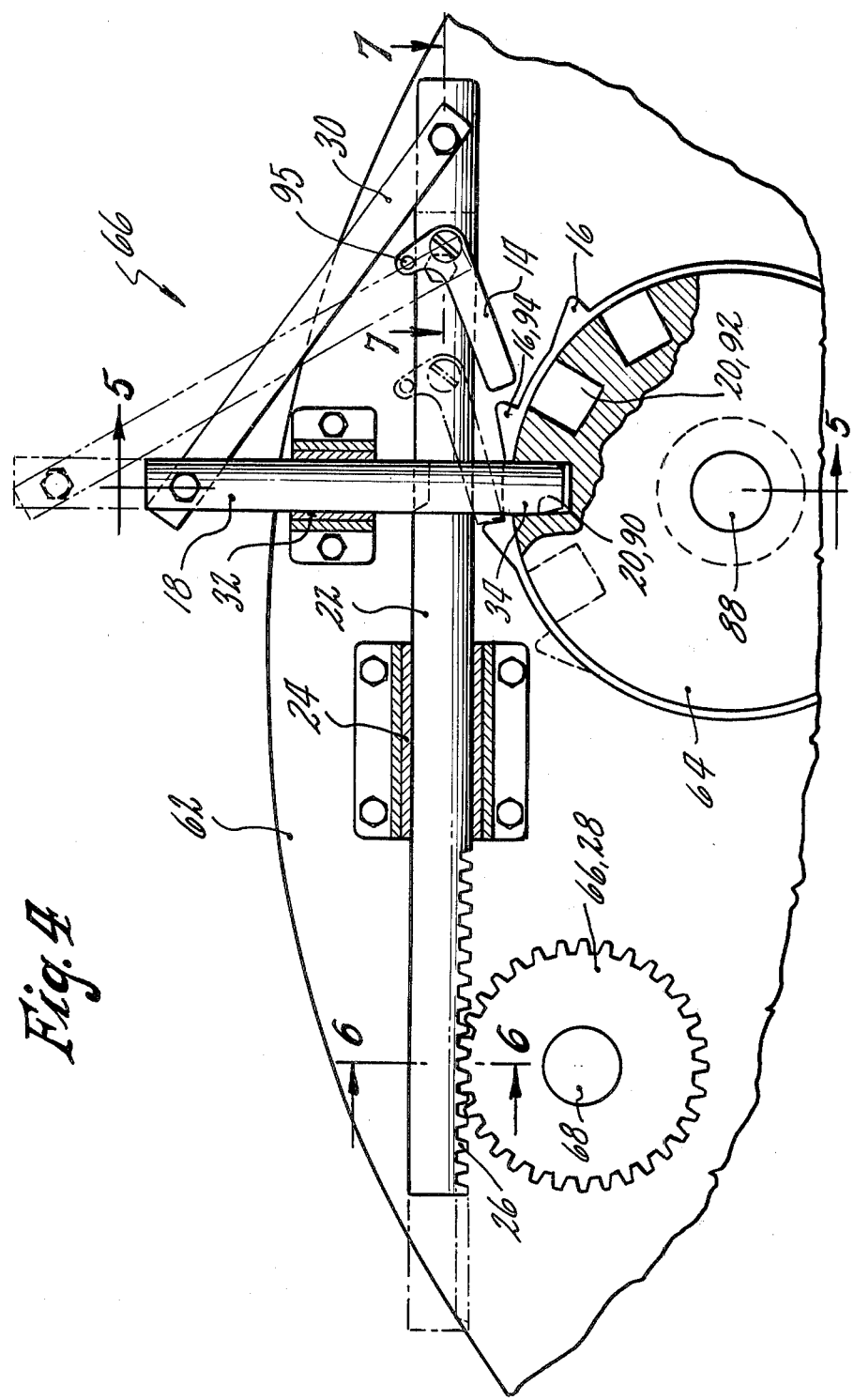

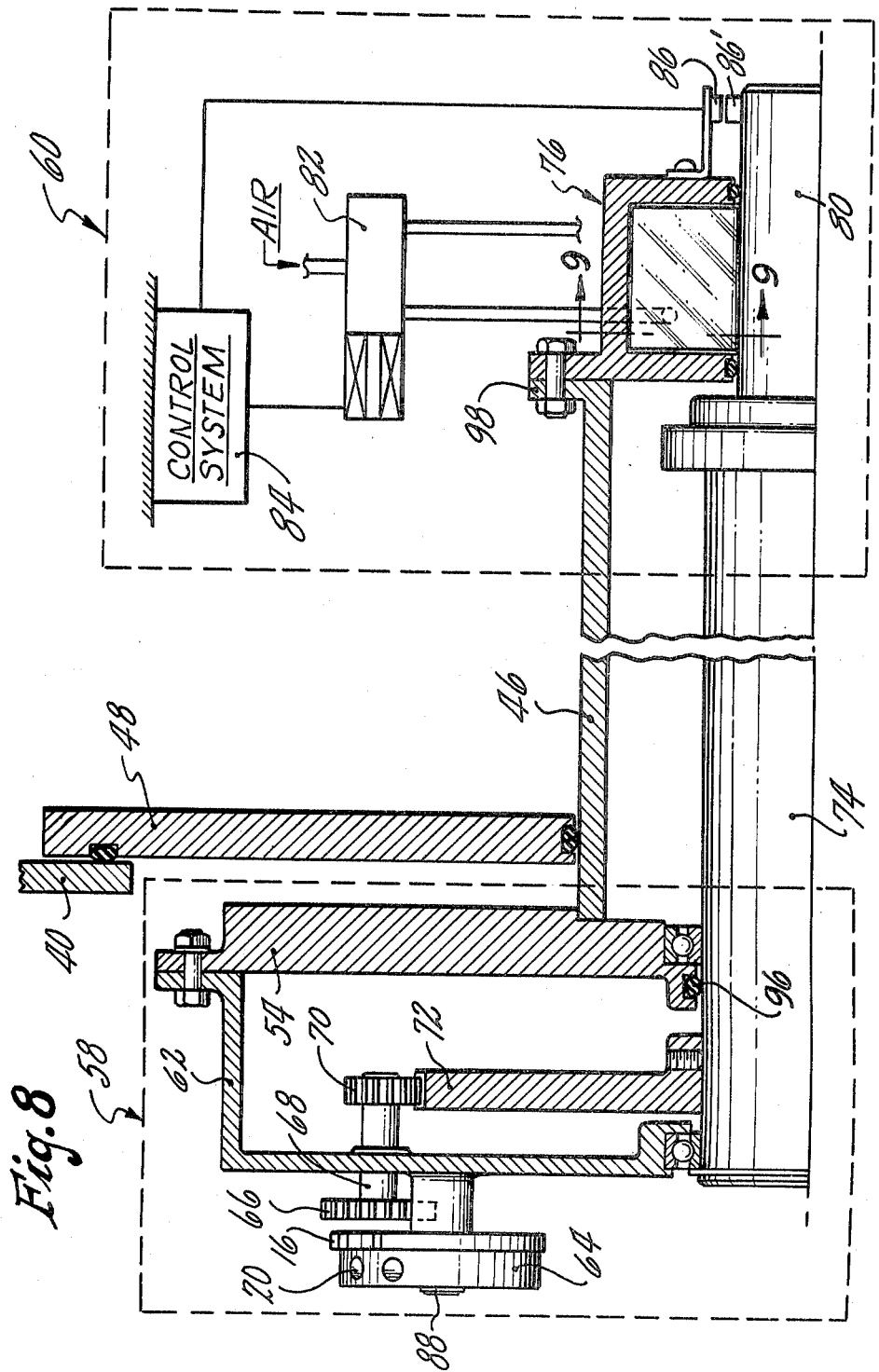

INDEXING APPARATUS FOR ELECTRON BEAM DRILLING

BACKGROUND ART

1. The present invention relates to the field of indexing mechanisms, most particularly those adapted for use with welding and drilling processes using beam energy, such as that provided by electron beams.

2. There are a great number of indexing mechanisms which are revealed by the prior art. Indexing mechanisms, as the name denotes, have as their function the sequential positioning of parts with respect to some fixed point. However, special problems arise when indexing is required to be undertaken in the harsh environment of an electron beam chamber. Not only does the presence of a high vacuum complicate the design, but the apparatus must be tolerable of the heat and shower of molten metal particles which are generated during the drilling process.

When specifically applied to the drilling of small diameter holes in the surface of a superalloy airfoil, the complexity of manipulation is increased. One reason for this is in the asymmetric nature of a gas turbine airfoil. Characteristically, the desired holes are oblique to the surface, which is often highly contoured in three dimensions. For practical purposes, in most electron beam drilling machines, the beam path is fixed within a small angle. Therefore, to put a row of holes in an airfoil, the part must be translated along the length of the row. To produce more than a single row on an airfoil, means must be further provided to translate the airfoil laterally with respect to the row length. To change the angle of any particular hole or part of a row, the part must be rotated with respect to the beam axis. If a multiplicity of airfoils are placed in a welding chamber at the same time, then further means must be provided for presenting each of the airfoils to the beam path. Thus, when a multiplicity of parts is sought to be simultaneously drilled with complex hole patterns, the cumulation of mechanical movements which are necessary can lead to systems which are unduly complex and therefore unreliable.

A further demand of electron beam hole drilling in airfoils is the accuracy which is desired. For example, a typical airfoil may require that holes of 0.45 to 1 mm diameter be spaced apart a distance of about 1.753±0.254 mm, with the hole axes being aligned with better than 0.1 degree of the desired positions.

As might be expected, there are a great number of known devices for indexing parts in rotary manner. U.S. Pat. No. 3,532,009, Hogan et al., shows a typical apparatus where rotational motion to the nominal position is accomplished by an indexing pawl, and thereafter a final, exact position is accomplished by a second independently operated positioning plunger. U.S. Pat. No. 2,985,038, Tandler et al., shows a relatively complex peg and pawl positioning system. Mead, in U.S. Pat No. 2,968,973, shows a chain-motivated rotary table where the nominal position is achieved by means of a spring-loaded pin; the pin is disengageable by means of a linkage activated by the same prime mover piston as activates the chain. As reference to the foregoing patents will indicate, the prior art mechanisms for rotational indexing are comprised of a great number of elements. For use in a vacuum chamber necessary for electron beam drilling, it is desirable that the number of elements be reduced, that the number of actuators or actuator rods be reduced, and that the prime movers be located external to the chamber.

DISCLOSURE OF INVENTION

An object of the invention is to provide a simple and reliable apparatus for manipulating and indexing a multiplicity of workpieces within a vacuum chamber.

According to the invention a multiplicity of assemblies is mounted on a translatable and rotatable housing which is insertable into a vacuum chamber. Each assembly contains a rotatable disk for holding an airfoil. Means are provided for rotating or indexing the disks with respect to the housing, to positions which correspond with the rows of holes which are sought on the airfoils. Means are further provided for locking the disks in precise position.

In each assembly, a single driving member actuates rotation and locking of the disks. In the preferred embodiment the single driving member is a rack gear shaft capable of simple linear motion. Each assembly has a rack gear shaft driven by a spur gear. The spur gears at all assemblies are driven by a central gear mounted on a single shaft which extends through the vacuum chamber wall.

The motion of the central gear and multiple rack gear shafts not only causes rotary motion of the disks but also causes engagement and disengagement of a shot pin which precisely locates the disk. This is embodied by each disk having both teeth and precision dimension cavities on its periphery. The number of teeth and cavities corresponds with the number of rows of holes to be drilled in the workpiece. Each rack gear shaft is mounted on the housing in proximity to each disk. Through a linkage, each rack gear shaft is connected to a tapered shot pin which selectably engages with the holes on the periphery of each disk. When a rack gear shaft is moved, the shot pin is caused to withdraw from a disk, thereby unlocking it from its position. Further translation of a rack gear shaft causes a spring loaded pawl mounted theron to engage with one of the teeth on the periphery of a disk, thereby causing the disk to rotate to a new nominal index position. The rotation of each spur gear is then reversed by action of the central gear with which they are all engaged. This causes every rack gear shaft to reverse direction. Each pawl disengages from each disk and the rack gear shaft and pawl combinations are returned to their original positions without further interaction with the disks. The reverse motion of the rack gear shafts also causes the shot pins to engage the proximate cavities on the disk peripheries. The shot pins are tapered. Thus a shot pin, on entering a cavity, will bring a disk to an accurate and final position, where it is locked by continuation of engagement of the shot pin. Thus, all stations are simultaneously unlocked, rotated to a nominal new position, precisely positioned and re-locked. This action is all caused by the simple rotation, first in one direction and then in the opposite direction, of the shaft on which the central gear is mounted. Rotation of the shaft may be undertaken by various means; the preferred means is a rotary vane air cylinder and attendant control system.

To drill several rows of holes in a part, the airfoils are identically mounted on disks which are all initially set at their zero position. Then a row of holes in each airfoil is produced by programmably rotating and translating the main housing. Next, rotation of the housing is ceased and the above-described indexing system is used to place the airfoils in a second position. Drilling of the second row then takes place by rotation and translation of the housing, in a manner analogous to that employed to drill the first row. Further rows may be made in like manner.

Particular features of the invention are that only mechanical elements are present within the vacuum chamber, and the system is therefore highly reliable. Further, since there is but a single actuating shaft passing through the wall of the chamber, preservation of the vacuum integrity of the system is greatly simplified.

The foregoing and other objects, features and advantages of the present invention will become more apparent from the following description of preferred embodiments and accompanying drawings.

BRIEF DESCRIPTION OF DRAWINGS

FIG. 1 is an elevation view of the electron beam drilling apparatus.

FIG. 2 is an end view of the housing, showing the five indexable workpiece stations thereon.

FIG. 3 is a perspective view of a disk, showing detail and the manner in which an airfoil contained in a fixture mounts thereon.

FIG. 4 is a more detailed view of one of the indexing stations shown in FIG. 2.

FIG. 5 is a partial sectional view through the apparatus of FIG. 4.

FIG. 6 is a sectional view through the shaft shown in FIG. 4.

FIG. 7 is a sectional view through the shaft and pawl of FIG. 4.

FIG. 8 is a sectional detail of parts of the apparatus shown in FIG. 1.

FIG. 9 shows a cross section through the drive cylinder of the apparatus in FIG. 8.

BEST MODE FOR CARRYING OUT THE INVENTION

The invention is described in terms of the drilling of holes in airfoil workpieces using an electron beam, but it will be seen that the invention will be useful in other manufacturing operations where precise indexing and positioning are desired. As FIG. 3 illustrates, the invention is described in the context of drilling a series of precisely located small holes 19 along the length of an airfoil 21 in a manner well-known to provide for film cooling. For illustration, three rows of holes are drilled in five parts. The invention will be applicable to other quantities of hole rows and parts.

With reference to FIG. 1, to perform electron beam drilling, parts are inserted into a vacuum chamber 40 having an electron beam gun apparatus 42 mounted thereon. While the angle at which the beam approaches the workpiece may be varied somewhat by manipulation of the beam path, the primary means of obtaining holes at a particular position and angle on a surface of a workpiece is to appropriately position and tilt the workpiece directly under the beam. It is desirable to have as many workpieces as possible inserted into the chamber prior to the initiation of a drilling sequence, to speed production by avoiding repetitive evacuation times. The airfoil parts 44 are mounted off a base plate 54 at the end of the primary manipulator shaft 46 which enters the chamber through a rotary and sliding seal plate 48 and has connected to it driving means 50 and 52, located external to the chamber. The shaft 46 is mounted in a frame 49 and is capable of motion through linear driver 52 and rotary driver 50. When the parts are fixed with respect to base plate 54, a hole in each part is obtainable by rotating the plate 54 by driver 50 to position each part in sequence under the beam; thereafter, a row is obtainable by longitudinally translating base plate 54 and parts thereon along the length of the row while repeating the drilling in each part, as for the first hole. In the most convenient practice, the rows are progressively drilled in all parts by continuous rotation of the main plate and timed beam pulsing in coordination therewith. It will be seen from FIGS. 2 and 4 that when the airfoils 44 are mounted fixedly at the end of the shaft 46 on base plate 54, only certain surfaces may be presented to the beam path 56 by the foregoing motions. Previously, after a single row was drilled in a group of parts, the vacuum would be broken and the parts were then manually rotated with respect to the base plate 54; then the group was reinserted into the chamber to drill a new row. Thus, an object of the present invention is to provide better means for rapidly and accurately rotating the parts 44 with respect to the base plate 54 without removal from the vacuum. The mechanisms which accomplish this are comprised generally of the apparatus mounted on the base plate 54 denoted in FIG. 8 generally by the dashed line 58 together with the mechanisms contained within the dashed line 60, mounted on the opposing exterior end of the main shaft. The mechanisms 60 primarily constitute the actuators and controls which cause motion within the chamber of the apparatus which grip the parts.

FIG. 2 shows a fragmentary end view of the apparatus 58 which is located inside the chamber. Elements of this apparatus are also shown in cross section in other Figures which may be referred to. A housing 62 is attached to the base plate 54. Mounted on shafts 88 at equally spaced increments around a circumference of the housing 62 are five rotatable disks 64. A gear, pawl and shot pin mechanism described in more detail below, both causes rotational motion of each of the disks and accurately locks them in position.

The disk 64, shown in more detail in FIG. 3 has a series of cavities 20 and teeth 16 on its exterior, the number of each at least equal to the number of rows to be drilled. The disk 64 is adapted to receive a fixture 68 which in turn is suited to accurately hold a part 44, 21. The circular shape of disk 64 is somewhat arbitrary, other than the portion which has the teeth and cavities, as will be evident from the following discussion. Thus, it is seen that rotation of the disks 64 will present a new portion of the surface of each airfoil 44 to the beam, as in turn each airfoil is presented for drilling by rotation of the base plate 54. Consequently, it is necessary that the rotation of all the disks 64 be accurately controlled, from one index position to another. The rotational indexing mechanism is now described.

FIG. 4 is an end view of one of the five indexing assemblies mounted on the housing 62. FIGS. 5–7 show fragmentary cross sections of the indexing mechanisms and should be also now referred to. The airfoil, not shown in FIG. 4, is mounted on the disk 64 which pivots about shaft 88. Rotational motion of the disk is obtained by engagement of a spring biased pawl 14 with teeth 16 which protrude from the rim of the disk. Once the disk is shifted to a new position by action of the pawl, it is very accurately located by engagement of a sliding shot pin 18 with one of the cavities 20 also located on the periphery of the disk, but at a different plane than the aforementioned teeth 16, as is evident from FIGS. 3 and 5.

The pawl 14 is mounted on a slidable rack gear shaft 22 which is contained in bushing 24 mounted on the housing 62. The shaft 22 has a rack gear portion 26 which engages a gear 66, 28 fixed to shaft 68 that is rotatable in the housing. Thus rotation of the gear 66, 28 will cause the rack gear shaft 22 to translate.

The rack gear shaft 22 is also connected to the extension of the shot pin 18 by means of a link 30 which is pivotally mounted at each end. The rack gear shaft and the shot pin are mounted at 90° angles while the link is mounted at nominally a 45° angle to the shot pin and rack gear shaft. The shot pin 18 is slidably mounted in a bushing 32 which is fixed to the housing 62. The dimensions of the three interconnected elements (18, 30, and 22) are such that, upon initial sliding motion of the rack gear shaft and motion of the pawl in the direction of the disk 64, the shot pin 18 is caused to retract from the hole 20, 90 in the disk. As the shot pin is retracted fully from the hole, the motion of the rack gear shaft continues, until the pawl engages a tooth 16, 94 and thereby causes rotary motion of the disk. When the desired angular degree of rotation is attained the motion of the rack gear shaft is reversed. Whereupon the shot pin is caused, by virtue of the linkage motion, to advance toward the disk and thereafter to enter the hole 20, 92 which has been newly positioned on the axis of its path. The shot pin has a taper at its nose 34 an thus causes any slight further movement of the rotary table necessary to bring the principal diameter of the shot pin and the hole into alignment. Since the shot pin closely fits the hole in the disk, and since the shot pin is accurately and firmly fixed to the housing upon which the disk is mounted as well, the accurate desired re-positionable of the airfoil is obtained. Thus it is seen the slidable rack gear shaft is a single driving member which both causes rotation and locking.

The pawl 14 is spring biased (not shown) toward the disk teeth, to engage them. Travel in the absence of proximity to a tooth is limited by pin stop 95. Thus, during the just-described reversing motion of the rack gear shaft 22, the pawl rides up over any teeth 16 in its reverse path and thereafter resumes its original position, ready for the next indexing. Of course, modifications in the pawl-teeth configuration may be made within the scope of the invention. Overshoot of the disk during forward rotation, or reverse motion due to pawl friction is prevented by a ball spring plunger mounted on the housing which engages a series of detents on the disk corresponding with the disk cavities. These elements are not shown. Other frictional means may be used to proximately stabilize the disk in its position.

In the preferred embodiment, rotation of the disks 64 is controlled by the gears 66. The manner in which the motion of a gear 66 is obtained will now be treated. Referring to FIG. 8, in which one of the five similar gear sub-assemblies in housing 62 is shown, gear 66 is mounted on a rotatable shaft 68 which has at its opposing end spur gear 70. The spur gear 70 engages a central gear 72 which is fixedly mounted to an inner drive shaft 74 which is rotatable within the housing 62, main plate 54, and bellow manipulator shaft 46. Seal 96 preserves the vacuum in the chamber. Thus, it may be seen that if the housing 62 is rotationally fixed, rotation of the single main drive element, shaft 74, both clockwise and counter-clockwise, will cause corresponding rotation of the gears 66, and consequent indexing of all the five airfoil holding disks simultaneously.

The necessary motion of the drive shaft 74 is achieved by means of a rotary vane type air cylinder 76, as shown in FIG. 9. Air supplied by a four-way flow valve 82, in response to a signal from the control system 84, causes 90° rotation of the cylinder output shaft 80 which is coupled to the drive shaft 74. Mechanical stops (not shown) limit the rotational motion of the shaft 80 with precision. The rotational motion of the drive shaft at its end points is confirmed by magnetically activated switches 86, according to the magnetic field produced by magnet 86' which is fixedly attached to the shaft 80. Signals from the magnetic switches activate the control system for the next step. When indexing is partially accomplished, the next step is reverse rotation of the inner shaft to complete indexing by shot pin insertion. When indexing has been fully completed, the next step is motion of manipulator 46 or initiation of beam drilling.

As pointed out, the manipulator shaft 46 rotates and translates in space, and the rotary motion of inner shaft 74 is with respect to the manipulator shaft. Thus, the actuator cylinder 76 and desirably the sensor system 86, 86' move with the shaft. The controls (82, 84) may move with the shaft or be connected to in with suitable connectors. It should be apparent that other means of effecting the desired rotation of the shaft 74 may be employed.

It should be seen that the exact degree of rotation of shaft 74 and the separate but simultaneous movements of the gears 66 is not highly critical. The disk 64 need only be caused to assume a new position with accuracy sufficient to present a new hole 20 for engagement by the tapered, smaller diameter end of the shot pin 18. Then, when the shot pin advances into the hole and engages it with its maximum diameter, any mis-positioning will be corrected and a location obtained consistent with the close tolerance characteristics of shot pins and locating holes (~0.025 mm). The final linear resting position of the shot pin mechanism is not critical, once the major shot pin diameter intercepts the hole. In practice it is found that angular location of parts on a 10 cm diameter housing may be obtained to a tolerance ±0.02 degrees. The apparatus consequently avoids any costs or problems which would result from the need for highly accurate gear positioning, anti-backlash mechanism, feedback loops, and the like. At the same time the apparatus provides only mechanical actuators in the chamber, with a single easily sealed rotary shaft driving means. Electrical, air, or hydraulic devices within the chamber are avoided.

To generalize, the invention provides indexing with both disengageable rotating and locking devices at all disk assembly stations, through rotation of the inner shaft from outside the chamber. In the inner shaft rest position all disks are locked for drilling; in moving to its actuated position the disks are unlocked and rotated to a nominal new position; in returning to its rest position, all disks are precisely located and locked.

Generally each assembly on the housing is comprised of a disk which is coupled with a nominal rotating mechanism (the rack gear shaft, pawl, and teeth) and a precision locating mechanism, (the shot pin and disk cavity). The rotating and precision locating mechanisms are alternately actuated by a single driving member, the rack gear shaft. This simplicity is a feature of the invention. Other members rather than the rack gear may be used as the driving member, to obtain the requisite interrelated motion of the pawl-carrying shaft 22, line 30, and shot pin 18. That is any one of the three, interconnected elements (18, 30, and 22) may be driven, as by action of other gears, cams, or linkages, interconnected with the inner shaft 74.

In use, the operator of the machine mounts each of the parts upon a disk, generally in the manner indicated by FIG. 3. The location of the airfoil 44 with respect to the disk 64 is determined by keyed fixtures and disk assemblies. To set any disk to its starting position the operator actuates the cylinder to disengage the shot pin. He then manually disengages the pawl and freely rotates the disk. He then actuates the cylinder to engage the shot pin, locking an airfoil in the position desired for drilling the first row of holes. When all assemblies are set he advances the housing into the chamber. After evacuation, rotational and translational motion of the shaft 46 is employed to drill the first row of holes. Then the cylinder 78 is actuated to rotate the shaft 74 the 90 degrees previously determined as being necessary to rotate the disks to the nominal position for the next row. Then the cylinder motion is reversed and the shaft 74 is restored to its rest position thereby causing engagement of the shot pins with the disks. Thereafter the motion of the manipulator shaft is commenced again and the second row of holes is drilled. In like manner succeeding rows of holes are also drilled. Upon the completion of the desired drilling, the vacuum is broken and the manipulator is retracted from the chamber, to remove the parts.

In the best practice of the invention, automatic processor control is used to speed the motion of the manipulator and the indexing mechanism. With suitable sensing devices and programming the aforementioned operations can be carried out at high speed and with a degree of simultaneity. Also, interlocks may be employed to insure that all the disks are in the same position, to avoid problems from operator error in setting the disks at the zero position or from failure of an individual assembly to index.

Although this invention has been shown and described with respect to a preferred embodiment, it will be understood by those skilled in the art that various changes in form and detail thereof may be made without departing from the spirit and scope of the claimed invention.

I claim:

1. Apparatus for indexing workpieces comprised of a plurality of assemblies mounted on a translatable and rotatable housing, each assembly comprising:
    (a) a disk rotatably mounted on the housing, for holding a workpiece;
    (b) means for rotating the disk to a multiplicity of selected rotational positions with respect to the housing, mounted on the housing;
    (c) means for locking the disk, to precisely locate the disk in said selected positions, attached to the housing; and
    (d) a movable single driving member mounted on the housing and connected to and actuating both the said means for rotating and the said means for locking, the member configured to cause the locking means and rotating means to be alternately engaged with the disk, to permit rotation from a first position to a second position followed by locking at the second position, and like motion to additional positions;
the apparatus further comprising a single main drive element connected to the plurality of single driving members for the transmission of simultaneous motion thereto.

2. The apparatus of claim 1 wherein each assembly is further comprised of a disk with a series of spaced apart teeth and spaced apart cavities on its outer periphery, the number of teeth and cavities each at least equal to the number of rotational positions; wherein the means for rotating the disk comprises a movable pawl mounted on the single driving member, for engaging the teeth to cause rotation of the disk; and, wherein the means for locking comprises a shot pin slidably mounted on the housing for precisely engaging the cavities.

3. The apparatus of claim 1 wherein the main drive element is a rotatable shaft with a central year, and wherein each assembly includes a gear train connecting the central gear with the single driving members of each assembly.

4. The apparatus of claim 2 wherein each assembly is further comprised of a single driving member which is a rack gear shaft slidable with respect to the disk; and wherein a linkage connects the rack gear shaft with the shot pin, to cause simultaneous motion of the shot pin and pawl.

5. The apparatus of claim 1 wherein the housing is mounted on a hollow manipulator shaft and the single main drive element is an inner shaft mounted within the manipulator shaft.

6. The apparatus of claim 5 further comprising rotational drive means mounted on the manipulator shaft, for driving the inner shaft.

7. The apparatus of claim 5 wherein the rotational drive means is a rotary cylinder.

8. The apparatus of claim 1 or 2 further comrprising an optical fiber position sensing system.

* * * * *